(12) United States Patent
Hu

(10) Patent No.: US 10,487,960 B2
(45) Date of Patent: Nov. 26, 2019

(54) HYDRAULIC VALVE

(71) Applicant: Bosch Rexroth (Changzhou) Co. Ltd., Wujin, Jiangsu (CN)

(72) Inventor: Qihui Hu, Jiangsu (CN)

(73) Assignee: Bosch Rexroth (Changzhou) Co. Ltd., Wujin, Jiangu (CN)

( * ) Notice: Subject to any disclaimer, the term of this patent is extended or adjusted under 35 U.S.C. 154(b) by 153 days.

(21) Appl. No.: 15/673,527

(22) Filed: Aug. 10, 2017

(65) Prior Publication Data

US 2018/0045328 A1 Feb. 15, 2018

(30) Foreign Application Priority Data

Aug. 10, 2016 (CN) .......................... 2016 1 0651660

(51) Int. Cl.
*F16K 31/383* (2006.01)
*F16K 39/04* (2006.01)
*F16K 27/04* (2006.01)
*F16K 11/07* (2006.01)

(52) U.S. Cl.
CPC ............ *F16K 31/383* (2013.01); *F16K 11/07* (2013.01); *F16K 11/0708* (2013.01); *F16K 27/041* (2013.01); *F16K 39/04* (2013.01)

(58) Field of Classification Search
CPC .... F16K 11/07; F16K 11/0712; F16K 11/074; F16K 11/0708; F16K 27/04; F16K 27/041; F16K 39/04; F16K 31/383
See application file for complete search history.

(56) References Cited

U.S. PATENT DOCUMENTS

| 5,944,042 A * | 8/1999 | Takahashi | ............... F16K 11/07 137/1 |
| 8,464,756 B2 * | 6/2013 | Navale | ................ F16K 11/0708 137/625.67 |
| 2013/0153068 A1 * | 6/2013 | West | .................... F16K 11/0708 137/625.69 |
| 2016/0327168 A1 * | 11/2016 | Hatano | .................... F16K 11/07 |

* cited by examiner

Primary Examiner — Ian G Paquette
(74) Attorney, Agent, or Firm — Michael Best & Friedrich LLP

(57) ABSTRACT

A hydraulic valve comprises: a spool; and a valve body defining a valve chamber for receiving the spool, wherein the spool is adapted to linearly reciprocate within the valve chamber in an axial direction, the valve chamber at least comprises a pressure chamber and a first working chamber, between which a first valve body shoulder is provided on the valve body, and the spool has a first spool shoulder adapted to contact with or axially disengage from the first valve body shoulder in order to hydraulically isolate the pressure chamber from the first working chamber or communicate the pressure chamber with the first working chamber.

18 Claims, 3 Drawing Sheets

HYDRAULIC VALVE

BACKGROUND OF THE INVENTION

The present invention relates to a hydraulic valve, and especially to a hydraulic valve having a low static flow force.

Hydraulic transmissions has many advantages relative to other types of transmissions such as mechanical transmissions and the like, such as small weight, sensitive to operations, capable of being frequently started and reversed, easy to operate and control and the like. The hydraulic transmissions thus have been widely used in a greater number of mechanical apparatuses.

A hydraulic control valve is indispensable to the various hydraulic transmissions, and is an element that controls the fluid pressure, flow rate and direction in the hydraulic transmission, and slide valve is a type of common hydraulic control valve.

To accurately control the slide valve, profound researches should be made on the stress and working process of the slide valve. Normally the hydraulic force, thrust force and spring force exerted on the slide valve are controllable and predictable. However, when the hydraulic fluid flows through the valve port, the spool will be suffered from an extra acting force, i.e., a flow force, since the change in the flow direction and flow rate will vary hydraulic fluid momentum, and such a force in turn will have an effect on control of the spool. The flow force normally varies with the size of the valve port, the flow amount through it and inlet pressure and so on.

The flow force may comprises a static flow force and a transient flow force, and the so-called static flow force refers to a force that acts on the spool and causes the valve to tend to close due to the change in momentum when the hydraulic fluid passes through the valve port, in terms of the certain valve opening amount. Thus, the static flow force will increase the force required for operating the slide valve, and especially in the case of high pressure and great flow rate, it has the significantly adverse influence on manipulation of the slide valve, even leading to the situation that the flow force is larger than the manipulation force to make action of the slide valve invalid. Thus, the problem as how to reduce or counteract the static flow force has received much attention in the hydraulic field.

Currently, the main solutions are as follows: 1), configuring the valve chamber in such a way that the hydraulic fluid flowing into and flow out from the valve chamber has the unchanged axial momentum, so as to reduce the axial flow force; and 2), employing a pilot valve for controlling the main spool. However, each solution will complicate the casting and machining processes of the slide valve, and further an extra pilot valve may be required, thereby increasing the cost of the slide valve. At present, the design for the valve chamber is relatively complex, causing the inconveniency to machine and manufacture.

Thus, it is urgent to provide a simple design for reducing the flow force of the slide valve. Reduction in the static flow force will in turn further simplify the design of the slide valve and reduce its cost.

SUMMARY OF THE INVENTION

One object of the present invention is to provide a hydraulic valve, which has the simple design and static flow force and can be manufactured at low cost.

In this end, according to the present invention, a hydraulic valve is provided, comprising: a spool; a valve body defining a valve chamber for receiving the spool, wherein the spool is adapted to linearly reciprocate within the valve chamber in an axial direction, the valve chamber at least comprises a pressure chamber and a first working chamber, between which a first valve body shoulder is provided on the valve body, and the spool has a first spool shoulder adapted to contact with or axially disengage from the first valve body shoulder in order to hydraulically isolate the pressure chamber from the first working chamber or communicate the pressure chamber with the first working chamber, wherein the pressure chamber is provided with a valve chamber flow guiding structure radially protruding inward, for lowering a static flow force within the hydraulic valve; and/or the first valve body shoulder at the side thereof facing the pressure chamber is provided with a first flow guiding slope for lowering a static flow force within the hydraulic valve; and/or the spool is provided with a first spool flow guiding structure which lowers a static flow force within the hydraulic valve by changing a flow path of a hydraulic fluid from the pressure chamber to the first working chamber.

Preferably, the valve chamber flow guiding structure comprises a connection portion for connection with the valve body and a flow guide portion for connection with the connection portion and located at the radial inner side of the connection portion, the axial width of the flow guide portion increases in a radially inward direction; and/or the first and second spool flow guiding structures comprise an extra shoulder between the first spool shoulder and second spool shoulder; and/or the first spool flow guiding structure comprises a first flow guide hook portion located on the side of the first spool shoulder facing the pressure chamber; and/or the second spool flow guiding structure comprises a second flow guide hook portion located on the side of the second spool shoulder facing the pressure chamber.

Preferably, the cross section of the flow guide portion is trapezoidal in shape; and/or the cross section of the connection portion is rectangular in shape; and/or the cross section of the extra shoulder is trapezoidal in shape; and/or the extra shoulder always keeps in contact with the valve chamber flow guiding structure in the radial direction during the working process of the hydraulic valve.

Hereinafter other optional embodiments of the present invention are described. The hydraulic valve of the present invention has a low static flow force and can be manufactured at low cost.

DESCRIPTION OF THE DRAWINGS

The basic principles, characteristics and advantageous of the present invention can be better understood hereinafter by illustrating the present invention in more details with reference to the drawings. The drawings include.

DETAILED DESCRIPTION

To make it clear the technical problem addressed by the present invention, the technical solutions and the advantageous technical effects of the present invention, hereinafter the present invention is described in more details by making reference to the drawings and examples. It should be appreciated that the specific examples just function to explain the present invention, without limiting the extent of protection of the present invention.

Figure 1:
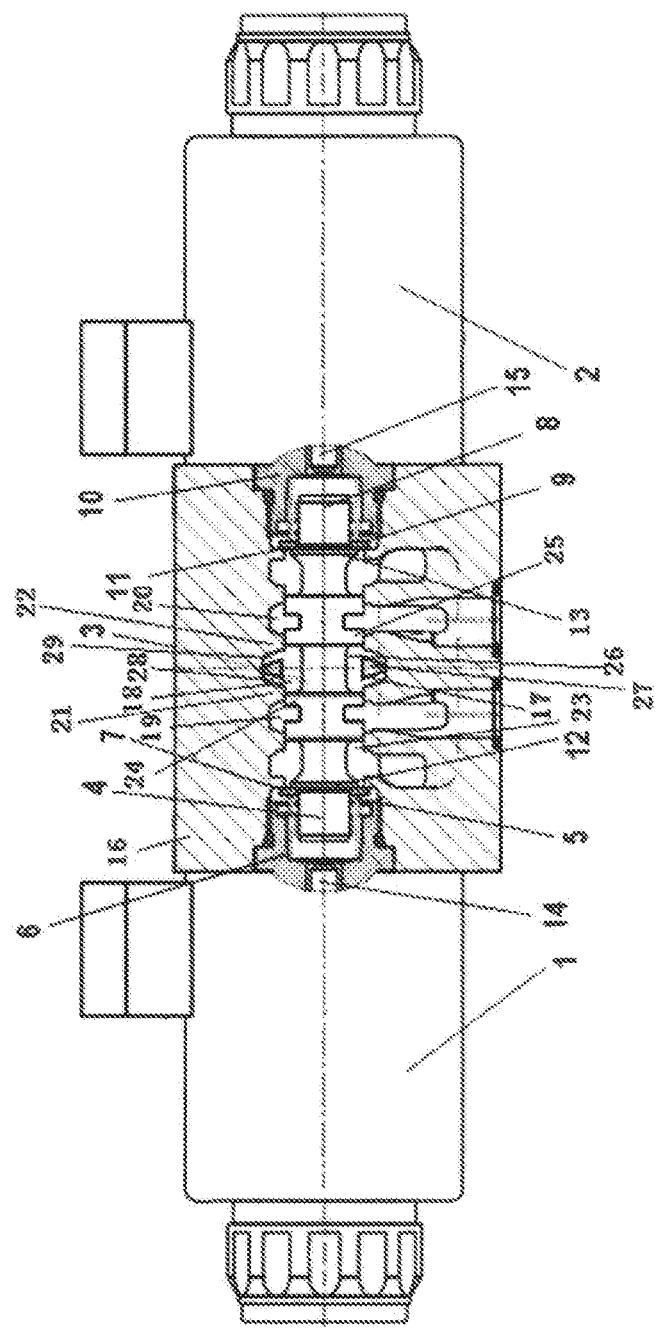
FIG. 1 is a partial longitudinal-sectional view of a slide valve according to one optional exemplary embodiment of the present invention.

FIG. 1 is a partial longitudinal-sectional view of a slide valve according to one optional exemplary embodiment of the present invention.

As shown in FIG. 1, the slide valve is a hydraulic electromagnetic directional valve, wherein the spool is operated and controlled by means of electromagnetic acting force generated by electromagnetic drive mechanisms. The slide valve comprises a first electromagnetic drive mechanism 1, a second electromagnetic drive mechanism 2, and a spool 3 between the first electromagnetic drive mechanism 1 and second electromagnetic drive mechanism 2. At the first end 4 of the spool 3, one end of a first spring 5 is supported on an iron core tube 6 of the first electromagnetic drive mechanism 1, and the other end thereof is supported on a first retainer ring 7. At the second end 8 of the spool 3 opposite to the first end 4, one end of a second spring 9 is supported on an iron core tube 10 of the second electromagnetic drive mechanism 2, and the other end thereof is supported on a second retainer ring 11.

The first spring 5 and/or second spring 9 normally are spiral springs, and the first spring 5 and the second spring 9 normally are at least partially nested correspondingly on the first end 4 and second end 8 of the spool 3, respectively.

It is usual that the first retainer ring 7 is nested on the first end 4 of the spool 3 and is axially stopped by a first step 12 of the spool 3. Similarly, the second retainer ring 11 is nested on the second end 8 of the spool 3 and is axially stopped by a second step 13 of the spool 3.

The spool 3 is at a centered position in the nonworking state under the action of the opposed axial spring forces generated by the first spring 5 and the second spring 9. Concretely, the first end 4 of the spool 3 passes through the first retainer ring 7, which in turn is axially stopped by the first step 12 at the first end 4 of the spool 3, so that the first spring 5 supported on the first retainer ring 7 can exert on the spool 3 a first axial acting force that acts toward the second end 8 of the spool 3. Similarly, the second end 8 of the spool 3 passes through the second retainer ring 11, which in turn is axially stopped by the second step 13 at the second end 8 of the spool 3, so that the second spring 9 supported on the second retainer ring 11 can exert on the spool 3 a second axial acting force that acts toward the first end 4 of the spool 3. The spool 3 can be maintained at the centered position in the nonworking state by selecting the spring property of the first spring 5 and the second spring 9. At the centered position, the slide valve preferably is at zero position, such that the fluid can not flow through the slide valve.

As shown in FIG. 1, the first electromagnetic drive mechanism 1 includes a first spool pushrod 14. When the first electromagnetic drive mechanism 1 is electrified, the first spool pushrod 14 can move toward the first end 4 of the spool 3 with the aid of an electromagnetic acting force, so as to push the spool 3 to move toward the second electromagnetic drive mechanism 2. Such movement of the spool 3 can change the slide valve to a first working state. At the first working state, the slide valve allows the fluid to flow therethrough in one direction.

Similarly, the second electromagnetic drive mechanism 2 includes a second spool pushrod 15. When the second electromagnetic drive mechanism 2 is electrified, the second spool pushrod 15 can move toward the second end 8 of the spool 3 with the aid of an electromagnetic acting force, so as to push the spool 3 to move toward the first electromagnetic drive mechanism 1. Such movement of the spool 3 can change the slide valve to a second working state. At the second working state, the slide valve allows the fluid to flow therethrough in another different direction to achieve the reversal.

Concretely, the slide valve has a valve chamber 17 defined at the interior of the valve body 16, and the valve chamber 17 at least comprises a pressure chamber 18 (also named as P chamber), and a first working chamber 19 (also named as A chamber) and a second working chamber 20 (also named as B chamber) located on the two axial sides of the pressure chamber 18, wherein the pressure chamber 18 is axially separated from the first working chamber 19 via a first annular shoulder 21 of the valve body 16, and the pressure chamber 18 is axially separated from the second working chamber 20 via a second annular shoulder 22 of the valve body 16. The first annular shoulder 21 and the second annular shoulder 22 are coaxially arranged to define an axial spool bore 23. Further, the first annular shoulder 21 and the second annular shoulder 22 preferably have the same interior diameter. The spool 3 is mounted within the spool bore 23, and axially moves within the spool bore 23 in dependence on the requirement.

The spool 3 at least includes a first annular shoulder 24, a second annular shoulder 25, and an annular groove 26 located between the first annular shoulder 24 and the second annular shoulder 25 in the axial direction. The annular groove 26 always is in communication with the pressure chamber 18. Obviously, in order to achieve the function of the slide valve, the exterior diameter of the first annular shoulder 24 of the spool 3 should correspond to the interior diameter of the first annular shoulder 21 of the valve body 16, and the exterior diameter of the second annular shoulder 25 of the spool 3 should correspond to the interior diameter of the second annular shoulder 22 of the valve body 16.

When the slide valve is at the zero position shown in FIG. 1, the outer circumferences of the first annular shoulder 24 and the second annular shoulder 25 of the spool 3 abut against the inner circumferences of the first annular shoulder 21 and the second annular shoulder 22 of the valve body 16 respectively, so that the hydraulic fluid in the pressure chamber 18 can not flow into the first working chamber 19 and into the second working chamber 20, that is, the flow path to the first working chamber 19 and the second working chamber 20 is cut off.

When the spool 3 moves toward the second electromagnetic drive mechanism 2, the second annular shoulder 25 of the spool 3 will disengage from the second annular shoulder 22 of the valve body 16 so as to form a first gap between the annular groove 26 and the second annular shoulder 22 of the valve body 16, so that the hydraulic fluid can flow into the second working chamber 20 from the pressure chamber 18 through the first gap. Here, the slide valve is at the first working state.

Figure 4:
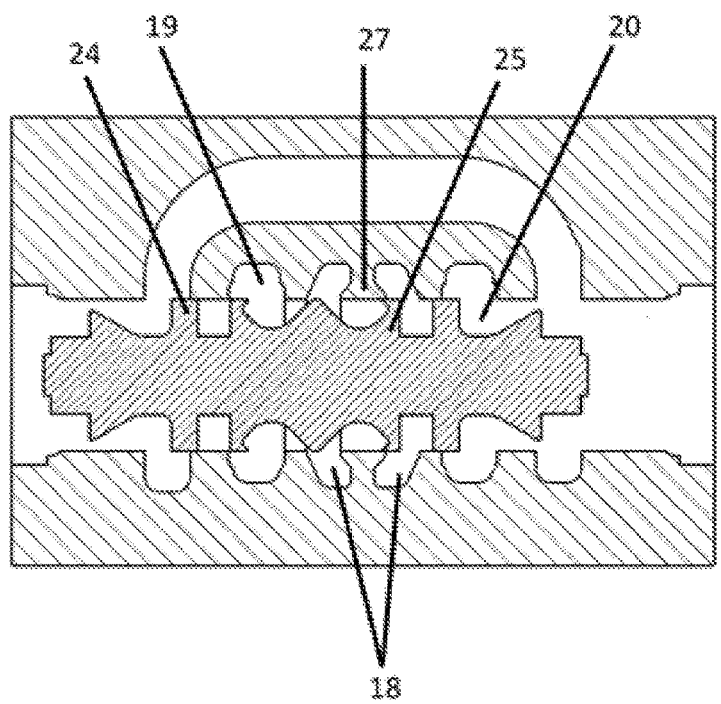
FIG. 4 illustrates the flow direction of the hydraulic fluid when the slide valve is in the second working state.

In a similar way, when the spool 3 moves toward the first electromagnetic drive mechanism 1, the first annular shoulder 24 of the spool 3 will disengage from the first annular shoulder 21 of the valve body 16 so as to form a second gap between the annular groove 26 and the first annular shoulder 21 of the valve body 16, so that the hydraulic fluid can flow into the first working chamber 19 from the pressure chamber 18 through the second gap. Here, the slide valve is at the second working state. This is illustrated in FIG. 4.

When the spool 3 changes into the first working state or second working state from the zero-position state, flow of the hydraulic fluid will generate a static flow force, which tend to switch off the slide valve so as to influence the control for the slide valve, and in extreme cases the electromagnetic drive mechanisms even can not cause the spool to move normally.

To this end, as shown in FIG. 1, provided within the pressure chamber 18 is a flow guiding structure 27 that radially protrudes inward from the valve body 16. According to one preferred embodiment of the present invention, the flow guiding structure 27 is integrally formed on the valve body 16.

The flow guiding structure 27 can enable the hydraulic fluid to flow into the first gap or second gap from the pressure chamber 18 in the desired direction (angle), so as to keep a balance with the flow of the hydraulic fluid from the first gap and second gap to the corresponding working chamber 19 or 20, thereby at least reducing the static flow force of the hydraulic fluid flow within the slide valve.

More concretely, the flow guiding structure 27 axially divides the pressure chamber 18 into two parts, i.e., a first pressure subchamber 28 and a second pressure subchamber 29. When the slide valve is at the first working state, due to the function of the flow guiding structure 27 and the fact that the first pressure subchamber 28 is covered by the first annular shoulder 24, the hydraulic fluid flows into the first gap mainly from the second pressure subchamber 29 at a predetermined angle relative to the radial direction, and then into the second working chamber 20 from the first gap at a substantially symmetrical angle relative to the radial direction, so as to reduce the static flow force of the hydraulic fluid flow within the slide valve. Similarly, when the slide valve is at the second working state, also due to the function of the flow guiding structure 27 and the fact that the second pressure subchamber 29 is covered by the second annular shoulder 25, the hydraulic fluid flows into the second gap mainly from the first pressure subchamber 28 at a predetermined angle relative to the radial direction, and then into the first working chamber 19 from the second gap at a substantially symmetrical angle relative to the radial direction, so as to likewise reduce the static flow force of the hydraulic fluid flow within the slide valve.

The existing slide valve has no such flow guiding structure, and as a result the hydraulic fluid flows into the first gap and the second gap substantially in the radial direction, but the flow of the hydraulic fluid from the first gap and the second gap to the corresponding working chamber usually is not in the radial direction. That is, in this case the angle included between the radial direction and the direction in which the hydraulic fluid flows to the corresponding working chamber is larger than the angle included between the radial direction and the direction in which the hydraulic fluid flows to the first gap and the second gap, and such difference in the angle gives rise to occurrence of the static flow force.

Thanks to the above flow guiding structure 27, it is possible to make the angle formed by the radial direction and the inflow direction of the hydraulic fluid toward the first gap or the second gap generally equal to the angle formed by the radial direction and the outflow direction of the hydraulic fluid from the first gap or the second gap, thereby reducing the static flow force.

The flow guiding structure 27 can extend along the whole circumference within the pressure chamber 18, or along a part of the circumference.

Figure 2:
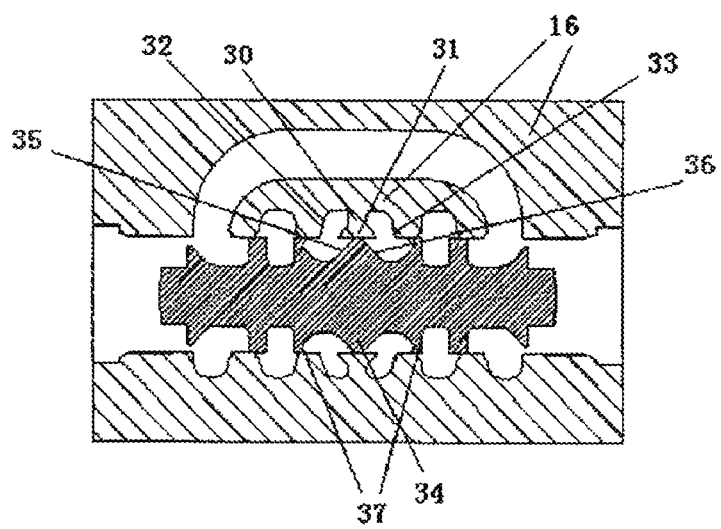
FIG. 2 is a longitudinal-sectional view illustrating in a simplified schematic view the further improvement or exhibition for the mainly-concerned spool and valve body of the present invention.

FIG. 2 is a longitudinal-sectional view illustrating in a simplified schematic view the further improvement or exhibition for the mainly-concerned spool and valve body of the present invention. The flow guiding structure 27 is illustrated in FIG. 2 more clearly. As shown in FIG. 2, the flow guiding structure 27 comprises a connection portion 30 for connection with the valve body 16 and a flow guide portion 31 for varying the inflow direction. There substantially is no limit to the shape of the connection portion 30, as long as it can stably support the flow guide portion 31, for example, it may have a generally rectangular cross section. The shape of the flow guide portion 31 just needs to enable the hydraulic fluid to flow into the first gap and/or second gap at the predetermined angle.

As shown in FIG. 2, the axial width of the flow guide portion 31 increases, preferably increases successively, in the radially inward direction, so that the hydraulic fluid can flow into the first gap and/or second gap at the increased angle relative to the radial direction compared with the existing slide valve. For example, the flow guide portion 31 may have a trapezoidal cross section. In a case where the cross section of the flow guide portion 31 is trapezoidal, the radial outer end of the flow guide portion 31 preferably is connected in a smooth transition mode with the radial inner end of the connection portion 30.

In certain embodiments, the flow guide portion 31 may extend along the entire circumference, while the connection portion 30 may extend along a part of the circumference, such as circumference part of 180 degrees, as long as the connection portion 30 can stably support the flow guide portion 31. In this case, one part of the flow guide portion 31 is in a suspended state. Certainly, the flow guide portion 31 also can be disposed along a part of the circumference, and even so the static flow force can be lowered to a certain degree. Such a partial disposing mode can be used in terms of the situation where the pressure port and pressure chamber disenable the connection portion and/or flow guide portion to be disposed along the entire circumference.

Referring to FIG. 1 back and in combination with FIG. 2, the flow guide portion 31 preferably is coaxially arranged with the axial spool bore 23. Here, the interior diameter of the flow guide portion 31 preferably is equal to the diameter of axial spool bore 23. In this case, more preferably, the inner circumference of the flow guide portion 31 is in contact with the outer circumference of the first annular shoulder 24 of the spool 3 when the slide valve is at the first working state. Whereby, it is possible to avoid shunting of the hydraulic fluid to better introduce the hydraulic fluid into the first gap at the desired angle. Similarly, the inner circumference of the flow guide portion 31 is in contact with the outer circumference of the second annular shoulder 25 of the spool 3 when the slide valve is at the second working state. Whereby, it also is possible to avoid shunting of the hydraulic fluid to better introduce the hydraulic fluid into the second gap at the desired angle.

Certainly, it is possible to configure the flow guide portion 31 not to contact with the spool 3 during the working process.

To further ensure that the hydraulic fluid can flow into the first gap and/or second gap at the predetermined angle, a flow guiding slope also may be formed at the radial inside corner of the first annular shoulder 21 and/or second annular shoulder 22 of the valve body 16 facing the pressure chamber 18. As shown in FIG. 2, a first flow guiding slope 32 is provided on the first annular shoulder 21 of the valve body 16, and a second flow guiding slope 33 is provided on the second annular shoulder 22 of the valve body 16. The flow guiding slopes cooperate with the flow guiding structure 27, so as to better ensure that the hydraulic fluid flows into the first gap and second gap at the predetermined angle.

The inclination angle, magnitude and/or form of the flow guiding slope can be determined according to the actual demand.

Certainly, for one of ordinary skill in the art, the flow guiding slope also may be individually used independently of the flow guiding structure, and the flow guiding slope may be disposed along the entire circumference or on a part of the circumference.

In order to further reduce the static flow force by changing the flow direction of the hydraulic fluid, some flow guide structures may be disposed on the spool. FIG. 2 illustrates a spool according to one optional exemplary embodiment of the present invention. As shown in FIG. 2, the spool is provided with an extra shoulder 34 between the first annular shoulder and the second annular shoulder, and the extra shoulder 34 preferably is always in contact with the flow guiding structure on the valve body, so as to better ensure that the hydraulic fluid flows into the first gap and the second gap at the predetermined angle.

More preferably, the cross section of the extra shoulder 34 is generally trapezoidal or triangular in shape, so that it has a first flow guiding ramp 35 and a second flow guiding ramp 36 at the two axial sides. Preferably, the first flow guiding ramp 35 and the second flow guiding ramp 36 have substantially the same inclination direction as the corresponding side of the flow guiding structure on the valve body, so as to better guide the hydraulic fluid flow.

The extra shoulder 34 preferably extends along the entire circumference to form an annular extra shoulder, or along a part of the circumference.

In order to further reduce the static flow force within the slide valve, the first annular shoulder and/or the second annular shoulder of the spool on the side facing the pressure chamber is provided with a barb-like flow guide hook portion 37, which is used for changing the direction in which the hydraulic fluid flows out from the first gap and/or the second gap. The flow guide hook portion 37 preferably is disposed along the entire circumference, or along a part of the circumference.

Preferably, the first flow guiding ramp 35 and the second flow guiding ramp 36 smoothly transition to the flow guide hook portions 37 on the first annular shoulder and the second annular shoulder of the spool, respectively.

Obviously, any flow guiding structures on the spool may be individually used independently of any flow guiding structures on the valve body.

Figure 3:
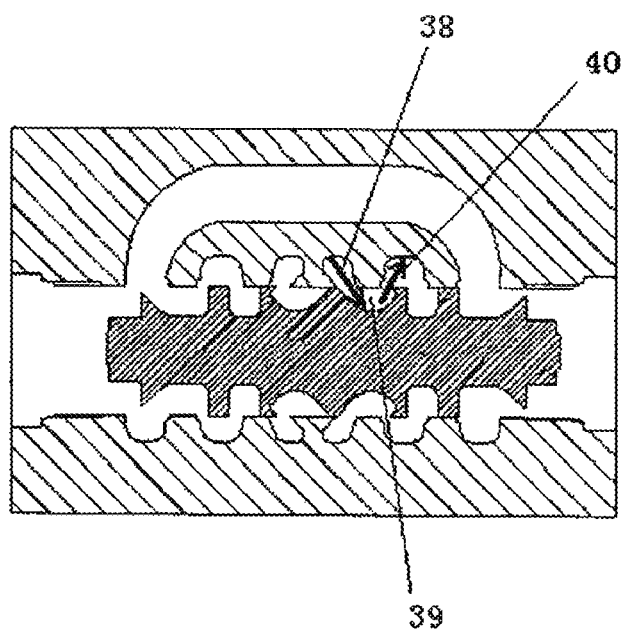
FIG. 3 illustrates the flow direction of the hydraulic fluid when the slide valve is in the first working state.

To describe the technical effects of the present invention, FIG. 3 illustrates the flow direction of the hydraulic fluid when the slide valve is at the first working state. The hydraulic fluid flows into the first gap 39 in the first direction 38, and then flows out of the first gap 39 in the second direction 40. The angle included between the first direction 38 and the radial direction is substantially the same as the angle included between the second direction 40 and the radial direction, to notably reduce the static flow force within the slide valve. Preferably, at the first working state, the second flow guiding ramp 36 is aligned with the corresponding slope of the flow guide portion 31. Similarly, the first flow guiding ramp 35 is aligned with the corresponding slope of the flow guide portion 31

It shall be noted that the so-called "contact" between the outer circumference of the structure on the spool 3 such as annular shoulder or extra shoulder and the inner circumference of the structure on the valve body 16 such as annular shoulder or flow guide portion refers to hydraulic contact, and does not exclude occurrence of small gaps therebetween in practice.

It can be seen from the above description that the present invention achieves the technical effect of notably reducing the static flow force in a simple design, without need of providing any individual devices. The above structural designs can be easily accomplished based on the existing slide valve, at the relatively low cost. On the other hand, the reduction in the static flow force also can lower the force for driving the slide valve, and here it is allowable to use the electromagnetic drive mechanisms having the relatively small driving force and the relatively low cost.

Further, it also has been found that the design of the present invention can reduce the valve pressure drop and noise, to further improve the properties of the slide valve.

Although above the present invention is described by taking the slide valve as an example, the technical concept of the present invention can be applied to many hydraulic valves.

For one of ordinary skill in the art, other advantages and alternative embodiments of the present invention are obvious. The present invention in term of the broader sense therefore is not limited to the described and illustrated details, representative structures and exemplary embodiments. Instead, one of ordinary skill in the art can make the various modifications and replacements without departing from the basic spirit and scope of the present invention.

The invention claimed is:

1. A hydraulic valve, comprising:
   a spool (3); and
   a valve body (16) defining a valve chamber (17) for receiving the spool (3), wherein the spool (3) is adapted to linearly reciprocate within the valve chamber (17) in an axial direction, the valve chamber (17) at least comprises a pressure chamber (18) and a first working chamber (19), between which a first valve body shoulder is provided on the valve body (16), and the spool (3) has a first spool shoulder adapted to contact with or axially disengage from the first valve body shoulder in order to hydraulically isolate the pressure chamber (18) from the first working chamber (19) or communicate the pressure chamber (18) with the first working chamber (19);
   wherein the pressure chamber (18) is provided with a valve chamber flow guiding structure radially protruding inward, for lowering a static flow force acting on the spool (3) within the hydraulic valve; and
   wherein the valve chamber flow guiding structure comprises a connection portion (30) connected to the valve body (16) and a flow guide portion (31) connected to the connection portion (30) and located at the radial inner side of the connection portion (30), the axial width of the flow guide portion (31) increasing in a radially inward direction.

2. The hydraulic valve as claimed in claim 1, characterized in that,
   the cross section of the flow guide portion (31) is trapezoidal in shape;
   the flow guide portion (31) extends along the entire circumference to form an annular form, or along a part of the circumference.

3. The hydraulic valve as claimed in any one of claim 2, characterized in that,
   the cross section of the extra shoulder (34) is trapezoidal or triangular in shape;
   the extra shoulder (34) always keeps in contact with the valve chamber flow guiding structure in the radial direction during the working process of the hydraulic valve.

4. The hydraulic valve as claimed in claim 1, characterized in that,
the first valve body shoulder at the side thereof facing the pressure chamber (18) is provided with a first flow guiding slope for lowering a static flow force acting on the spool (3) within the hydraulic valve.

5. The hydraulic valve as claimed in claim 4, characterized in that,
the spool (3) is provided with a second spool flow guiding structure which lowers a static flow force acting on the spool (3) within the hydraulic valve by changing a flow path of a hydraulic fluid from the pressure chamber (18) to the first working chamber (19).

6. The hydraulic valve as claimed in claim 5, characterized in that, the valve chamber (17) further comprises a second working chamber (20) located at the axially opposite side of the pressure chamber (18) relative to the first working chamber (19), provided between the second working chamber (20) and the pressure chamber (18) is a second valve body shoulder on the valve body (16), and the spool (3) further has a second spool shoulder adapted to contact with or axially disengage from the second valve body shoulder in order to hydraulically isolate the pressure chamber (18) from the second working chamber (20) or communicate the pressure chamber (18) with the second working chamber (20);
wherein the second valve body shoulder at the side thereof facing the pressure chamber (18) is provided with a second flow guiding slope for lowering a static flow force acting on the spool (3) within the hydraulic valve.

7. The hydraulic valve as claimed in 6, characterized in that,
in a case where the pressure chamber (18) is in hydraulic communication with the second working chamber (20), a hydraulic fluid flows from the pressure chamber (18) into a first gap between the second valve body shoulder and the spool (3) in a first direction, and then flows out of the first gap and into the second working chamber (20) in a second direction, the angle formed by the first direction and the radial direction is substantially equal to the angle formed by the second direction and the radial direction; and
in a case where the pressure chamber (18) is in hydraulic communication with the first working chamber (19), the hydraulic fluid flows from the pressure chamber (18) into a second gap between the first valve body shoulder and the spool (3) in a third direction, and then flows out of the second gap and into the first working chamber (19) in a fourth direction, the angle formed by the third direction and the radial direction is substantially equal to the angle formed by the fourth direction and the radial direction.

8. The hydraulic valve as claimed in claim 6, characterized in that,
the first valve body shoulder, the second valve body shoulder, the first spool shoulder and/or the second spool shoulder are annular shoulders; and
the second spool shoulder and the valve chamber flow guiding structure maintain contact in the radial direction, in a case where the pressure chamber (18) is in hydraulic communication with the first working chamber (19); and
the first spool shoulder and the valve chamber flow guiding structure maintain contact in the radial direction, in a case where the pressure chamber (18) is in hydraulic communication with the second working chamber (20).

9. The hydraulic valve as claimed in claim 8, characterized in that,
the first and second spool flow guiding structures comprise an extra shoulder (34) located between the first spool shoulder and second spool shoulder; and
the first spool flow guiding structure comprises a first flow guide hook portion located on the side of the first spool shoulder facing the pressure chamber (18); and
the second spool flow guiding structure comprises a second flow guide hook portion located on the side of the second spool shoulder facing the pressure chamber (18).

10. A hydraulic valve, comprising:
a spool (3) having a first spool shoulder and a second spool shoulder; and
a valve body (16) defining a valve chamber (17) for receiving the spool (3), wherein the spool (3) is adapted to linearly reciprocate within the valve chamber (17) in an axial direction, the valve chamber (17) at least comprises a pressure chamber (18) and a first working chamber (19), between which a first valve body shoulder is provided on the valve body (16);
wherein the first spool shoulder is adapted to contact with or axially disengage from the first valve body shoulder in order to hydraulically isolate the pressure chamber (18) from the first working chamber (19) or communicate the pressure chamber (18) with the first working chamber (19); and
wherein the first valve body shoulder at the side thereof facing the pressure chamber (18) is provided with a first flow guiding slope for lowering a static flow force acting on the spool (3) within the hydraulic valve; and
wherein the pressure chamber (18) is provided with a valve chamber flow guiding structure; and
wherein the second spool shoulder and the valve chamber flow guiding structure maintain contact in the radial direction, in a case where the pressure chamber (18) is in hydraulic communication with the first working chamber (19).

11. The hydraulic valve as claimed in claim 10, characterized in that,
the valve chamber flow guiding structure is radially protruding inward, for lowering a static flow force acting on the spool (3) within the hydraulic valve.

12. The hydraulic valve as claimed in claim 11, characterized in that,
the spool (3) is provided with a second spool flow guiding structure which lowers a static flow force acting on the spool (3) within the hydraulic valve by changing a flow path of a hydraulic fluid from the pressure chamber (18) to the first working chamber (19).

13. The hydraulic valve as claimed in claim 12, characterized in that,
the valve chamber (17) further comprises a second working chamber (20) located at the axially opposite side of the pressure chamber (18) relative to the first working chamber (19), provided between the second working chamber (20) and the pressure chamber (18) is a second valve body shoulder on the valve body (16), and the second spool shoulder is adapted to contact with or axially disengage from the second valve body shoulder in order to hydraulically isolate the pressure chamber

(18) from the second working chamber (20) or communicate the pressure chamber (18) with the second working chamber (20);

wherein the second valve body shoulder at the side thereof facing the pressure chamber (18) is provided with a second flow guiding slope for lowering a static flow force acting on the spool (3) within the hydraulic valve.

14. The hydraulic valve as claimed in claim 13, characterized in that, the first valve body shoulder, the second valve body shoulder, the first spool shoulder and/or the second spool shoulder are annular shoulders; and the first spool shoulder and the valve chamber flow guiding structure maintain the contact in the radial direction, in a case where the pressure chamber (18) is in hydraulic communication with the second working chamber (20).

15. The hydraulic valve as claimed in claim 14, characterized in that, the valve chamber flow guiding structure comprises a connection portion (30) connected to the valve body (16) and a flow guide portion (31) connected to the connection portion (30) and located at the radial inner side of the connection portion (30), the axial width of the flow guide portion (31) increases in a radially inward direction; and/or the first and second spool flow guiding structures comprise an extra shoulder (34) located between the first spool shoulder and second spool shoulder; and the first spool flow guiding structure comprises a first flow guide hook portion located on the side of the first spool shoulder facing the pressure chamber (18); and the second spool flow guiding structure comprises a second flow guide hook portion located on the side of the second spool shoulder facing the pressure chamber (18).

16. The hydraulic valve as claimed in claim 15, characterized in that, the cross section of the flow guide portion (31) is trapezoidal in shape;

the flow guide portion (31) extends along the entire circumference to form an annular form, or along a part of the circumference.

17. The hydraulic valve as claimed in any one of claim 16, characterized in that, the cross section of the extra shoulder (34) is trapezoidal or triangular in shape;

the extra shoulder (34) always keeps in contact with the valve chamber flow guiding structure in the radial direction during the working process of the hydraulic valve.

18. The hydraulic valve as claimed in 27, characterized in that, in a case where the pressure chamber (18) is in hydraulic communication with the second working chamber (20), a hydraulic fluid flows from the pressure chamber (18) into a first gap between the second valve body shoulder and the spool (3) in a first direction, and then flows out of the first gap and into the second working chamber (20) in a second direction, the angle formed by the first direction and the radial direction is substantially equal to the angle formed by the second direction and the radial direction; and in a case where the pressure chamber (18) is in hydraulic communication with the first working chamber (19), the hydraulic fluid flows from the pressure chamber (18) into a second gap between the first valve body shoulder and the spool (3) in a third direction, and then flows out of the second gap and into the first working chamber (19) in a fourth direction, the angle formed by the third direction and the radial direction is substantially equal to the angle formed by the fourth direction and the radial direction.

* * * * *